United States Patent [19]

Yamada et al.

[11] Patent Number: 4,871,107
[45] Date of Patent: Oct. 3, 1989

[54] METHOD FOR BONDING CERAMICS TO EACH OTHER OR A CERAMIC TO A METAL

[75] Inventors: Toshihiro Yamada; Akiomi Kohno, both of Ibaraki, Japan

[73] Assignee: Hitachi, Ltd., Tokyo, Japan

[21] Appl. No.: 140,224

[22] Filed: Dec. 31, 1987

Related U.S. Application Data

[63] Continuation-in-part of Ser. No. 846,346, Mar. 31, 1986, abandoned.

[30] Foreign Application Priority Data

Apr. 1, 1985 [JP] Japan .................................. 60-66445

[51] Int. Cl.⁴ ............................................... B23K 1/04
[52] U.S. Cl. ..................................... 228/121; 228/122
[58] Field of Search ................... 228/122, 124, 263.12, 228/121

[56] References Cited

U.S. PATENT DOCUMENTS 4,602,731 7/1986 Dockus ............................... 228/121
4,699,310 10/1987 Kohno et al. .................. 228/263.12

FOREIGN PATENT DOCUMENTS 190880 11/1983 Japan .................................. 228/122

Primary Examiner—Kenneth J. Ramsey
Attorney, Agent, or Firm—Antonelli, Terry & Wands

[57] ABSTRACT

A three-layer clad plate or a laminated sheet comprising a core piece made of aluminum or its alloy and surfaces made of an aluminum-silicon alloy is inserted between the bonding surfaces of ceramics or between the bonding surface of a ceramic and that of a metal. The resulting structure is maintained at a bonding temperature lower than the melting point of aluminum or its alloy and higher than the solidus of the aluminum-silicon alloy while pressurizing the inserting material, thus bonding the ceramics to each other or the ceramic to the metal.

9 Claims, 6 Drawing Sheets

METHOD FOR BONDING CERAMICS TO EACH OTHER OR A CERAMIC TO A METAL

CROSS REFERENCE TO RELATED APPLICATION

This application is a Continuation-In-Part Application of Ser. No. 846,346 filed Mar. 31, 1986, now abandoned.

BACKGROUND OF THE INVENTION

1. Field of the Invention

The present invention relates to a method for bonding ceramics to each other or a ceramic to a metal. Particularly, it relates to a method for bonding which is suitable for bonding of structural parts of a machine, electronic parts or the like.

British Patent No. 761045 discloses a method for bonding alumina to a metal. This method comprises oxidizing copper, placing the oxidized copper (cuprous oxide: $Cu_2O$) on a ceramic substrate, heating both at a temperature higher than the melting point of copper (1083° C.) and lower than the melting point of copper oxide (1230° C.) (to form copper oxide on the copper) and reacting a eutectic crystal consisting of copper oxide and liquid copper with the substrate to thereby bond the alumina to the metal.

The above method requires heating the components at a temperature higher than 1083° C., and lower than 1230° C., so that the difference in thermal expansion between alumina and a metal causes thermal stress when cooling the bonded components. Therefore, the alumina tends to crack, thus bringing about lowering of reliability with respect to strength. What is worse, the metal is distorted when heated. U.S. Pat. No. 4,037,027 discloses a method which comprises heating components at a low temperature at which an inserting material is not melted and pressing them, i.e., a solid phase bonding method. According to this method, no large thermal stress is generated, because the heating temperature is low. However, because the inserting material is not melted and an oxide layer is formed on the surface of the inserting material, the reaction between the inserting material and components to be bonded is slow, so that a high bond strength is difficultly obtained for a short time. Further, a high pressure is required to contact the bonding surfaces with each other tightly.

OBJECT OF THE INVENTION

The present invention aims at providing a method for bonding ceramics to each other or a ceramic to a metal, which comprises lowering bonding temperature to thereby depress the generation of thermal stress in cooling bonded components. Therefore, according to the method of the present invention, the ceramic hardly tends to crack, so that reliability with respect to strength is enhanced.

Further, the present invention aims at providing a method for bonding ceramic to a metal, wherein the bonding is carried out at a low temperature with a low bonding pressure to thereby depress thermal distortion of a metal, thus obtaining a product of a high dimensional accuracy.

SUMMARY OF THE INVENTION

To attain the above objects, the method of the present invention comprises placing a sheet comprising a core piece made of aluminum or its alloy and surfaces made of an aluminum-silicon alloy as an inserting material between ceramics or between a ceramic and a metal and carrying out the bonding at a bonding temperature higher than the solidus of the aluminum-silicon alloy and lower than the melting point of aluminum or its alloy (at which the aluminum-silicon alloy is melted but neither aluminum nor its alloy is melted), while pressurizing the inserting material. The bonding is preferably carried out in vacuum or in an inert gas atmosphere. Aluminum or its alloy has a melting point of 660° C. or below. Therefore, even if the bonding is carried out at a temperature higher than the melting point, thermal stress will be generated in cooling only in the temperature range of from the melting point to a room temperature, thus the temperature drop being small. Further, aluminum or its alloy has a very low yield point, so that thermal stress generated in cooling is relaxed by the yielding of aluminum or its alloy. For these reasons, the generation of thermal stress in ceramic is remarkably depressed, thus preventing the breakage of ceramic, which frequently occurs in the prior art.

Examples of the ceramic to be bonded according to the present invention include silicon nitride ($Si_3N_4$), sialon, silicon dioxide ($SiO_2$), glass, ferrite (Mn-Zn ferrite), zirconia ($ZrO_2$), silicon carbide (SiC), alumina ($Al_2O_3$), barium titanate ($BaTiO_3$), and calcium titanate ($CaTiO_3$), and calcium titanate ($CaTiO_3$). The method of the present invention has a very wide scope of application as compared with the prior art.

DETAILED DESCRIPTION OF THE INVENTION

EXAMPLE 1

Bonding of sialon to Cr-Mo steel

Figure 1:
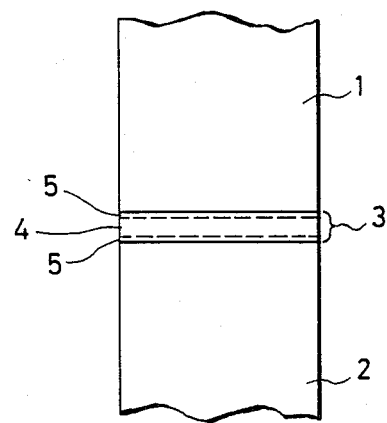
FIG. 1 is a diagram showing an example of bonding ceramic shafts to each other or a ceramic shaft to a metal shaft according to the method of the present invention.

As shown in FIG. 1, a three-layer clad plate 3 (having a thickness of 0.6 mm) comprising a core piece 4 made of an aluminum alloy (Al-1%Mn alloy) having a thickness of 0.5 mm and two surfaces 5 made of Al-Si-Mg alloy (Al-10% Si-2% Mg) and having a thickness of 0.05 mm was inserted between a shaft 1 made of sialon (having a diameter of 10 mm) and a shaft 2 made of Cr-Mo steel (having a diameter of 10 mm). The resulting structure was maintained at a bonding temperature of 600° C. with a bonding pressure of 1.0 Kg·f/mm$^2$ for 15 minutes under a vacuum of $10^{-4}$ Torr to bond the both shafts. The above Al-Si-Mg alloy has a melting point of about 585° C. Accordingly, only the both surfaces 5 of the clad plate 3 were melted at the bonding temperature of 600° C., so that the aluminum and silicon were reacted with the sialon and iron to thereby completely join the sialon shaft 1 to the Cr-Mo steel shaft 2 via the clad plate 3 metallurgically. The magnesium served to enhance the wetting power of the molten Al-Si alloy against the sialon and iron.

The bond strength (four-point bending test) of the shafts 1 and 2 joined in this Example was about 10 kg·f/mm$^2$ and the position of breakage was the bonding surface between the shaft 2 and the clad plate 3. Precisely, the intermetallic compound of Al with Fe was fragile to cause the breakage at this position. Accordingly, to further enhance the bond strength, it is preferred that a material exhibiting a low thermal expansion is inserted between the shaft 2 and the clad plate 3.

If the bonding is carried out at a temperature of 620° C. or above, the intermetallic compound formed by the reaction of Fe with Al ($Fe_3Al$, $Fe_2Al_5$) will be thick to lower the bond strength. Therefore, the bonding temperature must be lower than 620° C.

On the other hand, no lowering of bond strength was observed, when bonding pressure was reduced to 0.1 kg·f/mm$^2$ or enhanced to 2 kg·f/mm$^2$.

EXAMPLE 2

Bonding of $Si_3N_4$ to Cr-Mo steel

The bonding of a shaft made of $Si_3N_4$ to a shaft made of Cr-Mo steel was carried out according to the same procedure as the one described in Example 1. The bond strength was about 8 kg·f/mm$^2$.

EXAMPLE 3

Bonding of $Si_3N_4$ to SiC

According to the same procedure as the one described in Example 1, a three-layer clad plate comprising a core piece made of an aluminum alloy and two surfaces made of Al-Si-Mg alloy was inserted Between a shaft made of $Si_3N_4$ and a shaft made of SiC. The resulting structure was maintained at a bonding temperature of 600° C. with a bonding pressure of 1.0 kg·f/mm$^2$ under a vacuum of $10^{-4}$ Torr for 15 minutes to bond the both shafts. No cracks were observed in the bonding area and the bond strength was 14 kg·f/mm$^2$.

EXAMPLE 4

Bonding of $BaTiO_3$ to a ferrite (Mn-Zn ferrite)

Figure 2:
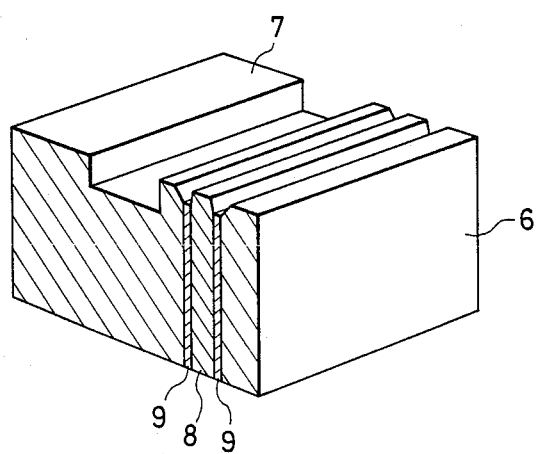
FIG. 2 is a diagram showing an example of bonding ceramic blocks to each other according to the method of the present invention.

As shown in FIG. 2, Mn-Zn ferrite 8 (having a thickness of 0.5 mm, a width of 6 mm and a height of 4 mm) was placed between a plate 6 made of $BaTiO_3$ (having a thickness of 0.7 mm, a width of 6 mm and a height of 4 mm) and a block 7 made of $BaTiO_3$ (having a thickness of 3 mm, a width of 6 mm and a height of 4 mm) and the same three-layer clad plates 9 comprising a core piece made of an aluminum alloy and two surfaces made of Al-Si-Mg alloy as the one used in Example 1 were inserted between the plate 6 and the ferrite 8 and between the block 7 and the ferrite 8. The resulting structure was maintained at a bonding temperature of 600° C. with a bonding pressure of 0.01 kg·f/mm$^2$ under a vacuum of $10^{-4}$ Torr to carry out the bonding. Neither the block 6 nor 7 nor the ferrite 8 was distorted at all. When the bonding areas and the blocks 6, 7 and 8 were observed with the naked eye and X-ray, no defects such as crack were observed.

Furthermore, the same procedure as the one described above was repeated except that calcium titanate ($CaTiO_3$) was used instead of barium titanate ($BaTiO_3$). The similar results were obtained.

EXAMPLE 5

Bonding of glass to $Al_2O_3$

Figure 3:
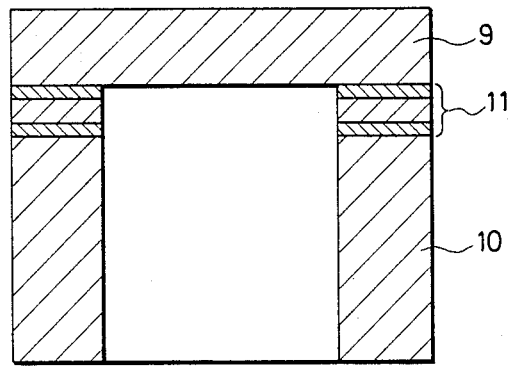
FIG. 3 is a diagram showing an example of bonding ceramic blocks to each other according to the method of the present invention.

As shown in FIG. 3, the same three-layer clad plate 11 comprising an aluminum alloy core piece and two surfaces made of Al-Si-Mg alloy as the one used in Example 1 was inserted between a commercially available glass plate 9 (having a thickness of 2 mm, a width of 10 mm and a length of 10 mm) and a ring 10 made of $Al_2O_3$ (having a height of 5 mm, an outer diameter of 10 mm and an inner diameter of 8 mm). The resulting structure was maintained at a bonding temperature of 600° C. with a bonding pressure of 0.05 kg·f/mm$^2$ under a vacuum of $10^{-4}$ Torr to carry out the bonding. The helium leakage test of the obtained bonded structure showed that a good airtightness of $10^{-8}$ Torr. l/sec or below was attained.

EXAMPLE 6

Bonding of SiC to Cr-Mo steel

In a similar manner as the one described in Example 1, a three-layer clad plate comprising an aluminum alloy core piece and two surfaces made of Al-Si-Mg alloy was inserted between a shaft made of SiC and a shaft made of Cr-Mo steel. The resulting structure was maintained at a bonding temperature of 600° C. with a bonding pressure of 1.0 kg·f/mm$^2$ under a vacuum of $10^{-4}$ Torr for 15 minutes to carry out the bonding. The bond strength was 5 kg·f/mm$^2$.

EXAMPLE 7

Bonding of SiC to Al

In a similar manner as the one described in Example 1, a three-layer clad plate comprising an aluminum alloy core piece and two surfaces made of Al-Si(10)-Mg(2) alloy was inserted between a shaft made of SiC and a shaft made of Al. The resulting structure was maintained at a bonding temperature of 585° C. with a bonding pressure of 0.1 kg·f/mm$^2$ under a vacuum of $10^{-4}$ Torr for 15 minutes to carry out the bonding. The bond strength was 4 kg·f/mm$^2$. No distortion of the aluminum shaft was observed.

EXAMPLE 8

Bonding of SiC to $Al_2O_3$

In a similar manner as the one described in Example 4, a three-layer clad plate having two surfaces made of Al-Si(10)-Mg(5) alloy was inserted between a plate made of SiC and a ring made of $Al_2O_3$. The resulting structure was maintained at a bonding temperature of 590° C. with a bonding pressure of 0.01 kg·f/mm$^2$ under a vacuum of $10^{-4}$ Torr for 30 minutes to carry out the bonding. In this case, the bonding pressure was very slight, so that a steel block was placed on the object to be jointed to thereby apply the dead weight on it and no pressurizing apparatus was used. The helium leakage test of the bonding structure showed that good airtightness of $10^{-8}$ Torr l/sec or below was attained. The bonding pressure can be lowered to about zero by adding magnesium to an inserting material.

EXAMPLE 9

Bonding of various ceramics to various metals and ceramics.

In a similar manner as the one described in Example 1, a three-layer clad plate (having a thickness of 0.6 mm) comprising an aluminum alloy core piece and two surfaces made of the Al-Si-Mg alloy was inserted between a ceramic shaft and a metal shaft and a ceramic shaft.

The resulting structure was maintained at a bonding temperature of 600° with a bonding pressure of 1.0 Kg·f/mm$^2$ under a vacuum of $10^{-4}$ Torr for 30 minutes to carry out the bonding. Bonding strengths were measured by a four-point bend test. Next table shows the results of the tests. As shown in the table the invention can be applicable to various ceramics and metals. Consequently, numerous combinations of ceramics and metals are possible and it is not necessary to develop a suitable bonding process for each combination.

TABLE

| Bending strength of various joints | | | |
|---|---|---|---|
| Combination | Bending strength (kg/mm$^2$) | Combination | Bending strength (kg/mm$^2$) |
| Sialon/Sialon | 29 | Sialon/WC—Co | 31 |
| Si$_3$N$_4$/Si$_3$N$_4$ | 27.5 | Si$_3$N$_4$/WC—Co | 14 |
| SiC/SiC | 14.5 | ZrO$_2$/Carbon Steel | 26 |
| Sialon/Si$_3$N$_4$ | 28 | ZrO$_2$/Cr—Mo Steel | 24 |
| Sialon/SiC | 15 | ZrO$_2$/Stainless Steel | 13 |

Figure 4:
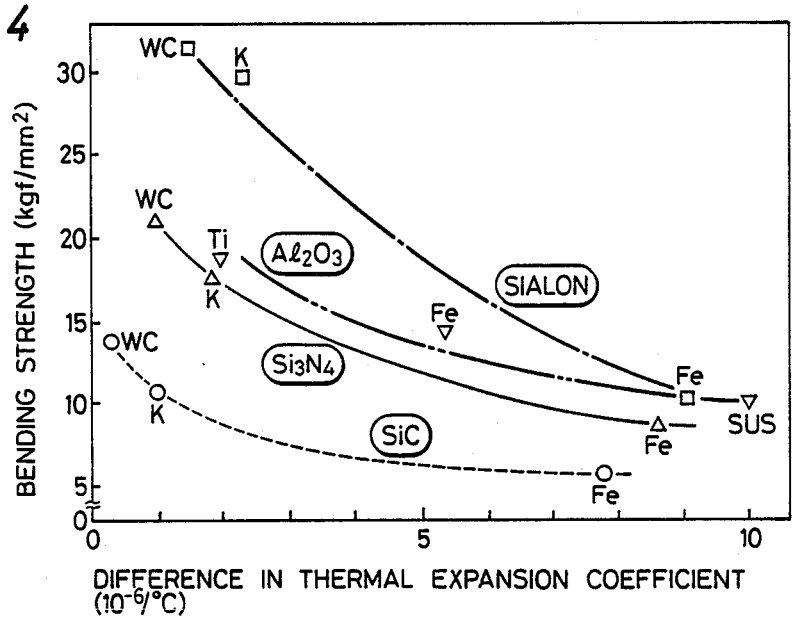
FIG. 4 is a graph showing the bending strength of specimens joined with Al-Si filler plotted as a function of the difference in the thermal expansion.

FIG. 4 shows bending strength of specimens joined with Al-Si filler plotted as a function of the difference in the thermal expansion coefficient. Bonding conditions for each of the samples are: temperature at 610° C., pressure at 0.5 kg·f/mm$^2$, time of 30 min, interlayer thickness of 0.6 mm; a flux was not used.

This invention is application to many kinds of ceramics and metals.

Figure 5:
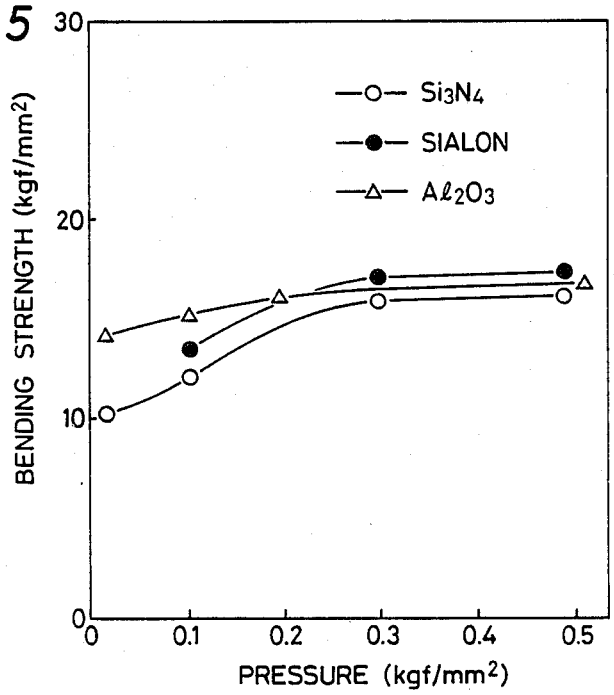
FIG. 5 is a graph showing the effect of pressure on bending strength of ceramics/steel (0.2% C) joints.

FIG. 5 shows the effect of pressure on bending strength of ceramics/steel (0.2% C) joints.

Figure 6:
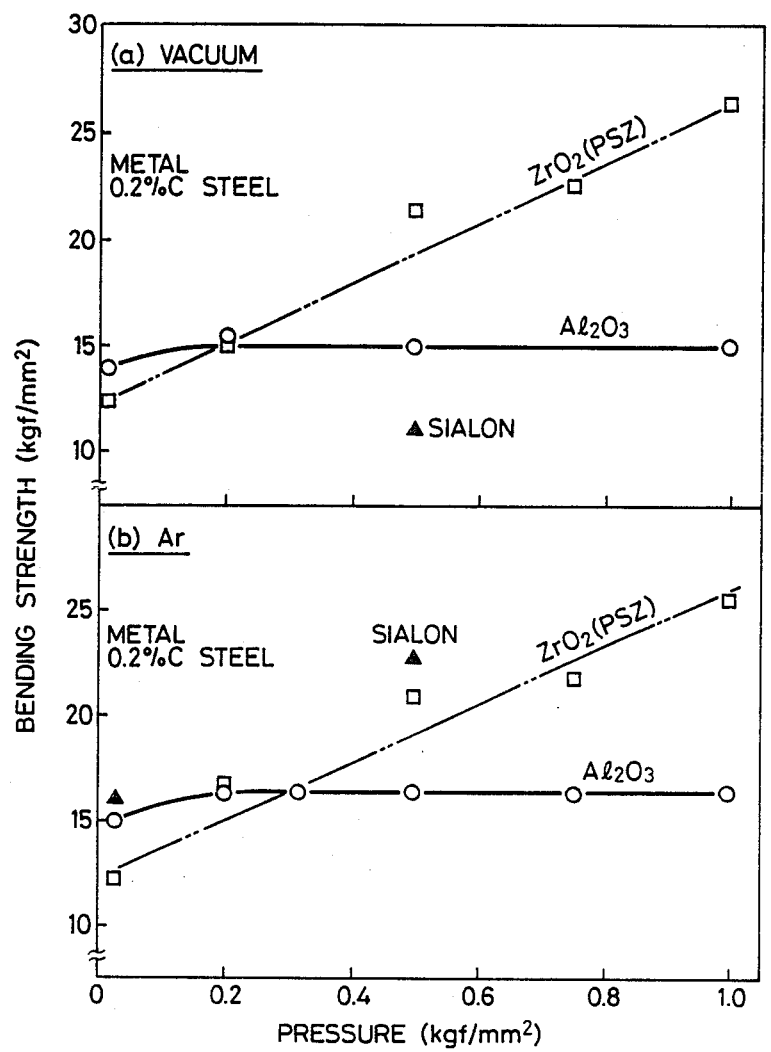
FIG. 6 is a graph showing the effect of pressure and atmosphere on bending strength.

FIG. 6 shows the effect of pressure and atmosphere on bending strength.

Figure 7:
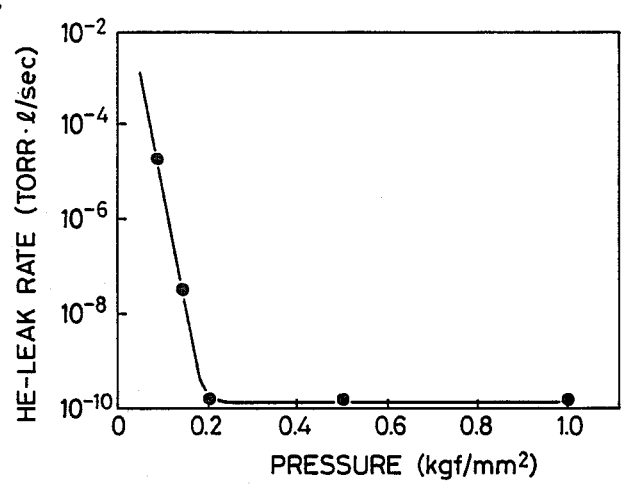
FIG. 7 is a graph showing the results of He-leak tests of specimens bonding with various bonding pressure.

FIG. 7 shows the results of He-leak tests of specimens bonded with various bonding pressure.

FIG. 5, FIG. 6 and FIG. 7 show that it is necessary to apply pressure in order to obtain a higher bond strength and better tightness of joints.

As apparent from FIG. 7, the bonding method according to the present invention requires pressure for obtaining a completely airtight seal product when applied to the production of such product and the lower limit for the pressure condition is 0.1 kg·f/mm$^2$ for the bonding of metal-ceramic and 0.01 kg·f/mm$^2$ for between ceramics. The pressure is preferably lower than 7 kg·f/mm$^2$. In FIG. 7, since He leak rate is about $10^{-8}$ torr liter/sec at 0.1 kg·f/mm$^2$, there is no practical problem.

Considering the combination of SiC/Al$_2$O$_3$ in Example 4, He-leak rate can be lowered to less than $10^{-8}$ torr liter/sec under the pressure of 0.01 kg·f/mm$^2$, because the thermal expansion difference between both of the bonding members is small. While on the other hand, in the combination between Fe and SiC as in the sample shown in FIG. 7, pressure has to be increased since the expansion difference is great.

In the case of applying the present invention to the bonding between metal and ceramic, the time for applying pressure under the bonding temperature is desirably from 5 min to 2 hr, because the reaction product from the metal and Al-Si insert material grows to an excessive thickness at higher temperature to possibly degrade the strength in the bonding portion. There is no particular restriction for the bonding between ceramics so long as the time of pressing is more than 5 min. and it will be utmost 2 hr. in an economical point of view.

Figure 8:
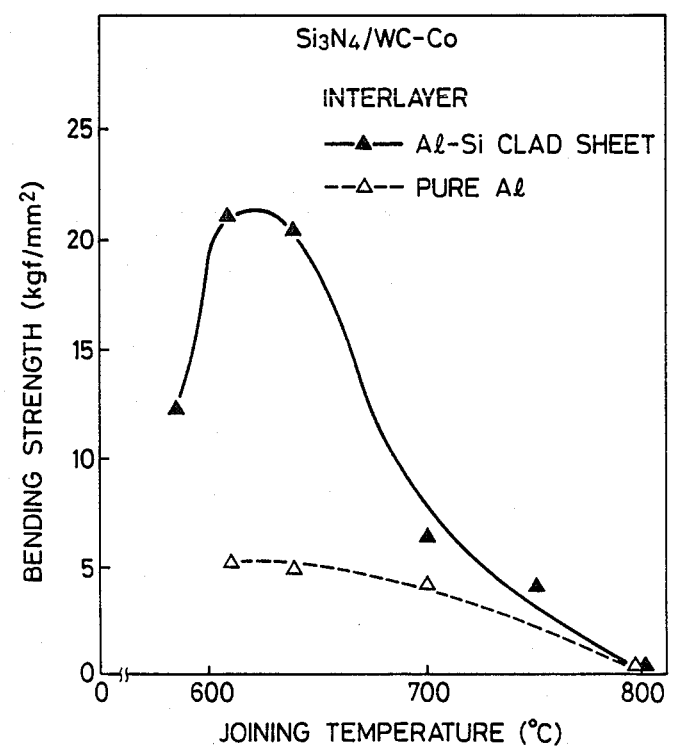
FIG. 8 is a graph showing the effect of joining temperature on bending strength of joints.

FIG. 8 shows the effect of joining temperature on bending strength of joints. The bonding conditions are: pressure at 0.5 kg/mm$^2$, time 30 min., interlayer thickness of 0.6 mm and the composition of Al-Si clad of: Al-10% Si-2% Mg. Under the condition of the bonding temperature in this example (585°–660° C.), only the surface Al-Si alloy layer is melted.

The maximum strength is obtained at 610° C. and with Al-Si alloy interlayer, the joint strength is much higher than that with pure aluminum one.

Figure 9:
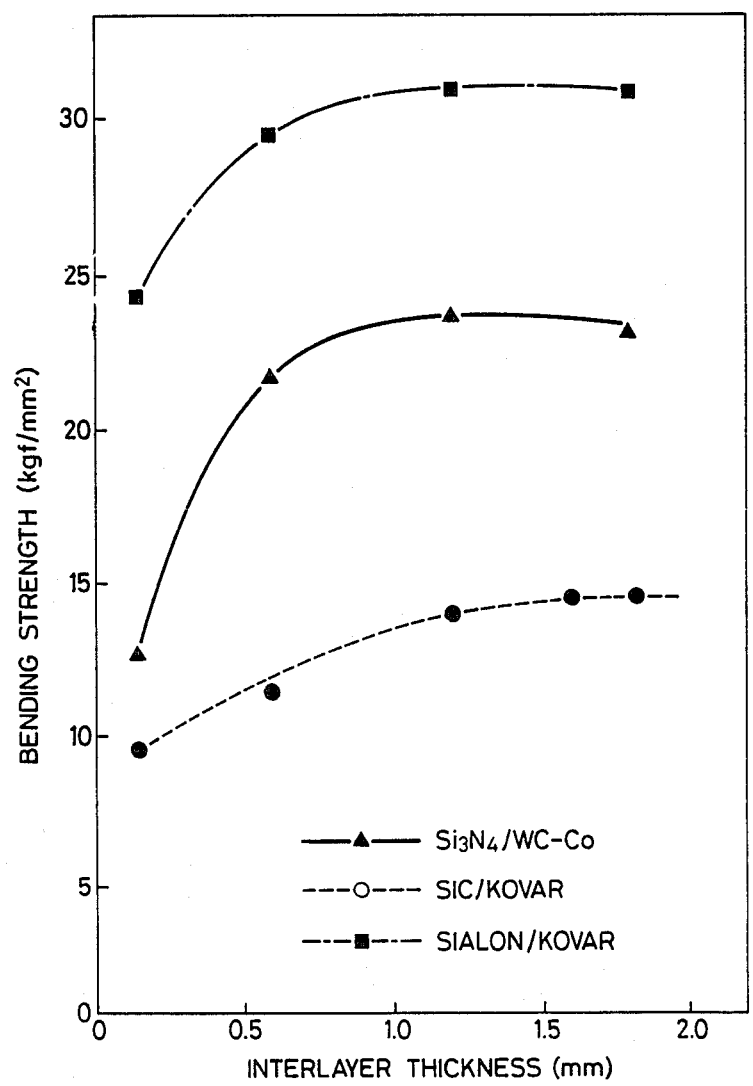
FIG. 9 is a graph showing the effect of thickness of Al-Si insert on the joint strength.

FIG. 9 shows, the effect of thickness of Al-Si insert on the joint strength. The bending strengths increase gradually with the interlayer thickness and tend to level off at 1.2 mm in thickness.

Figure 10:
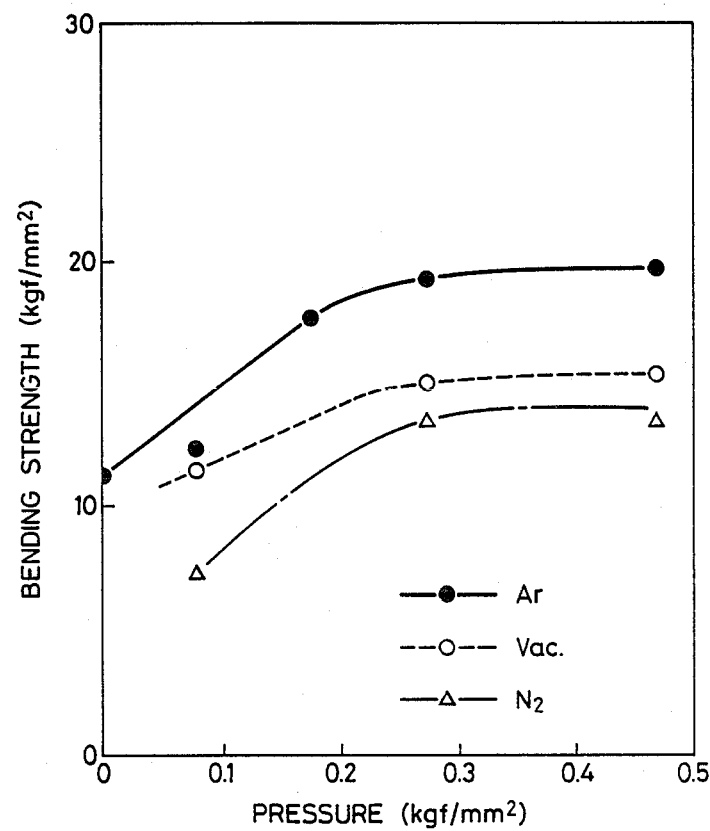
FIG. 10 is a graph illustrating the bending strength of sialon/carbon steel (0.2% C) joints bonded at various atmosphere.

FIG. 10 shows the bending strength of sialon/carbon steel (0.2% C) joints bonded at various atmosphere.

What is claimed is:

1. A method for bonding ceramics to each other or a ceramic to a metal by inserting an inserting material between the bonding surfaces of ceramics or between the bonding surface of a ceramic and that of a metal and heating, wherein a three-layer clad plate comprising a core piece made of aluminum alloy and surfaces made of an aluminum-silicon alloy is used as said inserting material and bonding is carried out at a bonding temperature higher than the solidus of the aluminum-silicon alloy and lower than the melting point of the aluminum alloy while pressurizing the inserting material, said ceramic is a member selected from the group consisting of silicon nitride, sialon, and silicon carbide, said aluminum-silicon alloy is aluminum-silicon-magnesium alloy and said metal is a member selected from the group consisting of carbon steel, alloy steel and copper alloy.

2. A method for bonding ceramics to each other or a ceramic to a metal as set forth in claim 1, wherein the applied pressure is 0.01 to 2 kg·f/mm$^2$ for bonding ceramics to each other and 0.1 to 2 kg·f/mm$^2$ for bonding a ceramic to a metal.

3. A method for bonding ceramics to each other or a ceramic to a metal by inserting an inserting material between the bonding surfaces of ceramics or between the bonding surface of a ceramic and that of a metal and heating, wherein a three-layer clad plate comprising a core piece made of pure aluminum and surfaces made of an aluminum-silicon alloy is used as said inserting material and bonding is carried out at a bonding temperature higher than the solidus of the aluminum-silicon alloy and lower than the melting point of the aluminum alloy while pressurizing the inserting material, said ceramic is a member selected from the group consisting of silicon nitride, sialon, and silicon carbide, said aluminum-silicon alloy is aluminum-silicon-magnesium alloy and said metal is a member selected from the group consisting of carbon steel, alloy steel and copper alloy.

4. A method for bonding ceramics to each other or a ceramic to a metal by inserting an inserting material between the bonding surfaces of ceramics or between the bonding surface of a ceramic and that of a metal and heating, wherein a laminated sheet comprising a core piece made of an aluminum alloy and surfaces made of an aluminum-silicon alloy is used as said inserting material and bonding is carried out at a bonding temperature higher than the solidus of the aluminum-silicon alloy and lower than the melting point of the aluminum alloy while pressurizing the inserting material, said ceramic is a member selected from the group consisting of silicon nitride, sialon, and silicon carbide, said aluminum-silicon alloy is aluminum-silicon-magnesium alloy and said metal is a member selected from the group consisting of carbon steel, alloy steel and copper alloy.

5. The method for bonding ceramics to each other or ceramic to a metal as set forth in claim 3, wherein the applied pressure is 2 kg·f/mm$^2$.

6. The method for bonding ceramics to each other or ceramic to a metal as set forth in claim 4, wherein the applied pressure is 2 kg·f/mm$^2$.

7. The method for bonding a ceramic to a metal as set forth in claim 1, wherein the ceramic is a member selected from the group consisting of sialon, SiC and silicon nitride and the metal is an alloy steel.

8. The method for bonding a ceramic to a metal as set forth in claim 1, wherein the ceramic is sialon or silicon nitride and the metal is a copper alloy.

9. The method for bonding ceramics to each other as set forth in claim 1, wherein the ceramics are members selected from the group consisting of silicon nitride, sialon and silicon carbide.

* * * * *